United States Patent
Hammer et al.

(10) Patent No.: US 9,950,744 B2
(45) Date of Patent: Apr. 24, 2018

(54) VEHICLE HOOD ASSEMBLIES INCLUDING A REINFORCEMENT STRAP AND VEHICLES INCLUDING THE SAME

(71) Applicant: Toyota Motor Engineering & Manufacturing North America, Inc., Erlanger, KY (US)

(72) Inventors: Jeremiah T. Hammer, Ann Arbor, MI (US); Aaron R. Steinhilb, Milan, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 63 days.

(21) Appl. No.: 15/079,433

(22) Filed: Mar. 24, 2016

(65) Prior Publication Data
US 2017/0274937 A1    Sep. 28, 2017

(51) Int. Cl.
*B62D 25/12*    (2006.01)
*B62D 25/08*    (2006.01)

(52) U.S. Cl.
CPC ........... *B62D 25/12* (2013.01); *B62D 25/082* (2013.01)

(58) Field of Classification Search
CPC ...... B62D 25/105; B62D 21/15; B62D 25/12; B62D 29/002; B62D 29/008
USPC ..... 296/93.11, 187.04, 191; 180/69.2, 69.22, 180/232, 69.23
See application file for complete search history.

(56) References Cited

U.S. PATENT DOCUMENTS

| | | | |
|---|---|---|---|
| 5,124,191 A * | 6/1992 | Seksaria | .................. B32B 3/28 180/69.2 |
| 5,706,908 A | 1/1998 | Sakai et al. | |
| 6,848,738 B2 | 2/2005 | Kempf et al. | |
| 7,390,055 B2 | 6/2008 | Tsushima et al. | |
| 7,578,548 B2 | 8/2009 | Behr et al. | |
| 7,635,157 B2 | 12/2009 | Wang et al. | |
| 7,690,720 B2 * | 4/2010 | Wang | .................. B62D 25/105 180/69.2 |
| 7,878,578 B2 | 2/2011 | Iwai et al. | |
| 7,988,222 B2 | 8/2011 | Fujimoto | |
| 8,052,198 B2 | 11/2011 | Seksaria et al. | |
| 8,356,857 B2 | 1/2013 | Ralston et al. | |
| 8,485,588 B1 | 7/2013 | Voss et al. | |
| 9,033,407 B2 | 5/2015 | Ikeda et al. | |
| 9,283,923 B2 * | 3/2016 | Ray | ........................ B60R 21/34 |
| 2008/0088154 A1 * | 4/2008 | Rocheblave | ............ B60R 21/34 296/187.04 |
| 2012/0211297 A1 | 8/2012 | Ralston et al. | |

\* cited by examiner

*Primary Examiner* — D Glenn Dayoan
*Assistant Examiner* — Sunsurraye Westbrook
(74) *Attorney, Agent, or Firm* — Dinsmore & Shohl LLP

(57) ABSTRACT

A vehicle hood assembly includes a hood outer panel, a hood inner panel coupled to and positioned below the hood outer panel in a vehicle vertical direction, where at least a portion of the hood inner panel is spaced apart from the hood outer panel in the vehicle vertical direction such that the hood outer panel and the hood inner panel define a gap between the hood outer panel and the hood inner panel, and a reinforcement strap coupled to at least one of the hood outer panel and the hood inner panel, the reinforcement strap including a base portion and a rippled portion that extends outward from the base portion in the vehicle vertical direction.

20 Claims, 9 Drawing Sheets

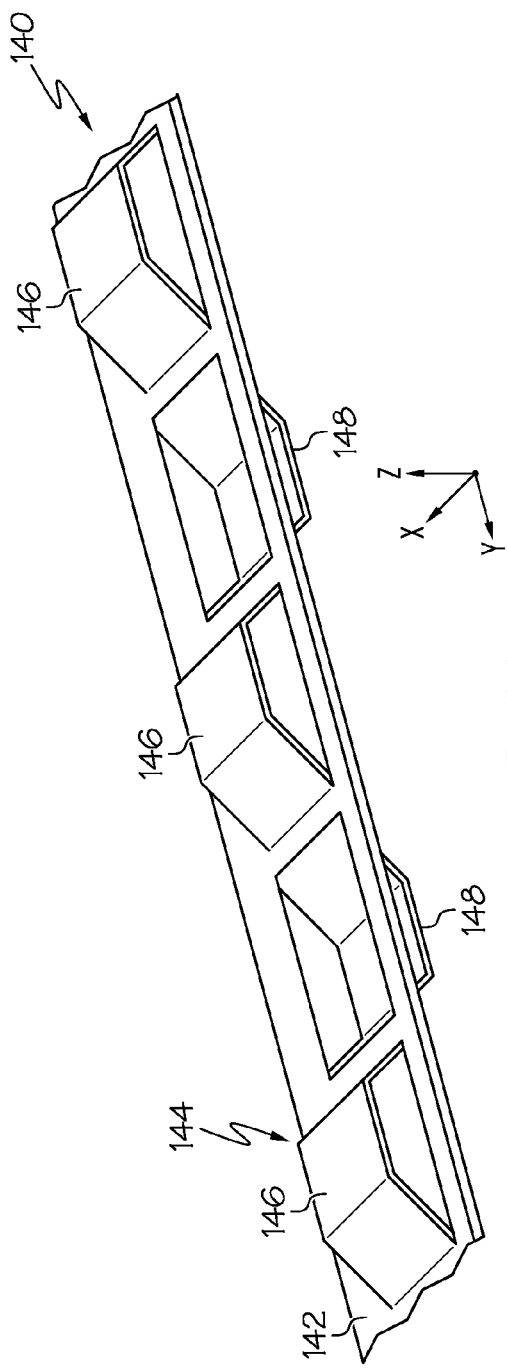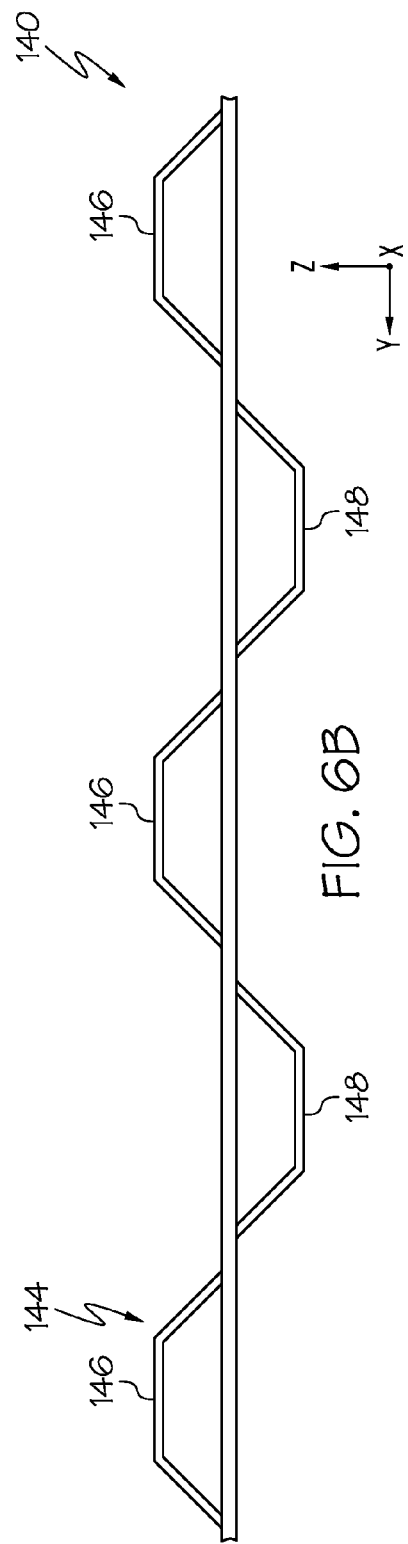

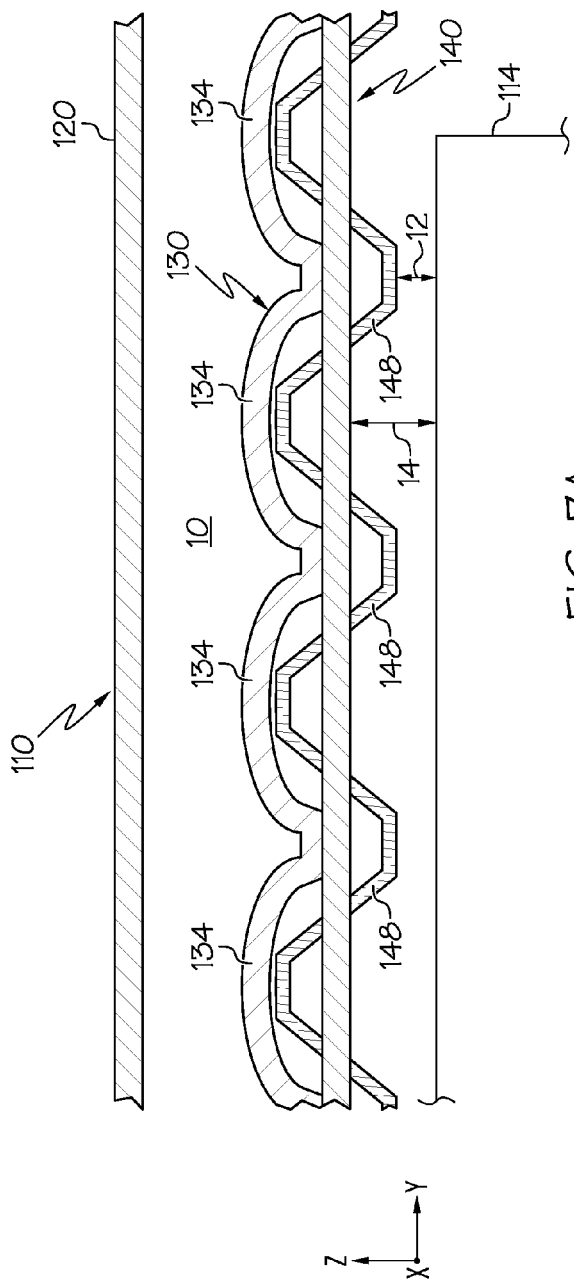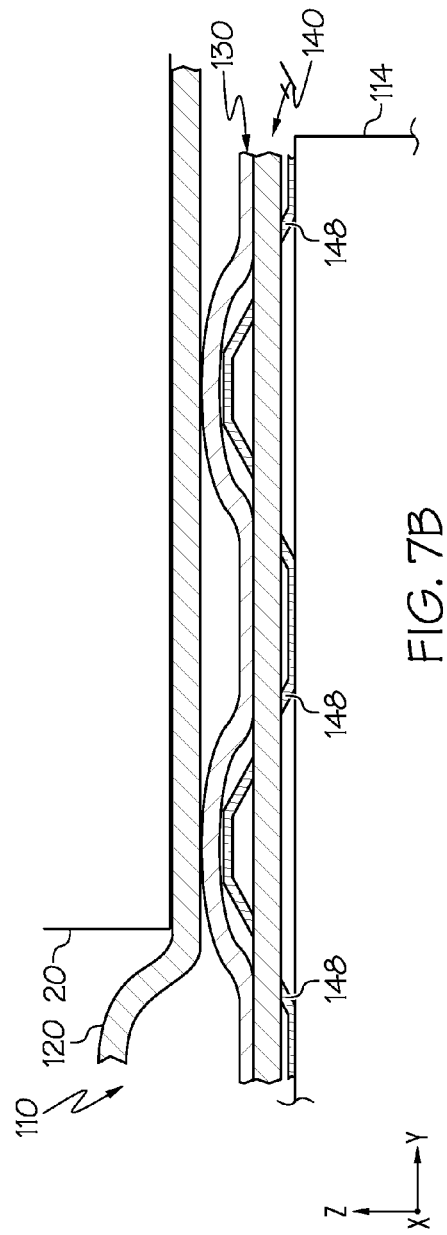

VEHICLE HOOD ASSEMBLIES INCLUDING A REINFORCEMENT STRAP AND VEHICLES INCLUDING THE SAME

TECHNICAL FIELD

The present specification relates to vehicle hood assemblies, and in particular, to vehicle hood assemblies including a reinforcement strap. Vehicles including vehicle hood assemblies including a reinforcement strap are also described.

BACKGROUND

Vehicles include may include a vehicle hood assembly positioned at a front of the vehicle that selectively covers an engine compartment of the vehicle. The vehicle hood assembly may include one or more panels which may be shaped to reduce the weight of the vehicle hood assembly and/or to accommodate customer styling demands.

During an impact, such as an impact with a headform at the front of the vehicle, the headform may impact the vehicle hood. In such impact configurations, it is desirable to selectively deform the vehicle hood to absorb energy associated with the impact. Accordingly, a need exists for alternative vehicle hood assemblies that may selectively deform during an impact.

SUMMARY

In one embodiment, a vehicle hood assembly includes a hood outer panel, a hood inner panel coupled to and positioned below the hood outer panel in a vehicle vertical direction, where at least a portion of the hood inner panel is spaced apart from the hood outer panel in the vehicle vertical direction such that the hood outer panel and the hood inner panel define a gap between the hood outer panel and the hood inner panel, and a reinforcement strap coupled to at least one of the hood outer panel and the hood inner panel, the reinforcement strap including a base portion and a rippled portion that extends outward from the base portion in the vehicle vertical direction.

In another embodiment, a vehicle includes an engine bay, a drive unit positioned in the engine bay, a hood assembly selectively positioned over the engine bay, the hood assembly including a hood outer panel and a hood inner panel positioned below the hood outer panel in a vehicle vertical direction, and a reinforcement strap coupled to at least one of the hood inner panel and the hood outer panel, the reinforcement strap including a base portion and a trough extending downward from the base portion in the vehicle vertical direction.

In yet another embodiment, a vehicle includes an engine bay, a drive unit positioned in the engine bay, a hood selectively positioned over the engine bay, the hood including a hood outer panel and a hood inner panel positioned below the hood outer panel in a vehicle vertical direction, where the hood inner panel includes a plurality of bones extending in a vehicle longitudinal direction, and a reinforcement strap coupled to the plurality of bones, the reinforcement strap including a base portion and a rippled portion that extends outward from the base portion in the vehicle vertical direction, where the base portion extends between adjacent bones in a vehicle lateral direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 6A schematically depicts a perspective view of another reinforcement strap according to one or more embodiments shown and described herein;

FIG. 6B schematically depicts a side view of the reinforcement strap of FIG. 7A according to one or more embodiments shown and described herein;

FIG. 7A schematically depicts a cross-section of the vehicle of FIG. 1 along section 7A-7A during ordinary vehicle operation according to one or more embodiments shown and described herein;

FIG. 7B schematically depicts a cross-section of the vehicle of FIG. 1 along section 7B-7B during an impact with a barrier according to one or more embodiments shown and described herein;

DETAILED DESCRIPTION

Vehicle hood assemblies including a reinforcement strap are described herein. The reinforcement straps provide a reinforcement structure that can be attached to the hood inner panel to provide increased energy absorption following vehicle hood assembly bucking toward engine components. The reinforcement straps not only provide for increased energy absorption, but also increased energy absorption with decreased stroke without seeing a spike in acceleration of a headform upon hood inner panel contact with the drive unit. These and other embodiments will be described in more detail below in reference to the appended drawings.

As used herein, the term "vehicle longitudinal direction" refers to the lengthwise direction of components of the vehicle (i.e., in the +/−X-direction as depicted). The term "vehicle lateral direction" refers to the cross-component direction (i.e., in the +/−Y-direction as depicted), and is transverse to the longitudinal direction. The term "vehicle vertical direction" refers to the upward-downward direction of the vehicle (i.e., in the +/−Z-direction as depicted), and is transverse to the vehicle longitudinal direction and the vehicle lateral direction.

Figure 1:
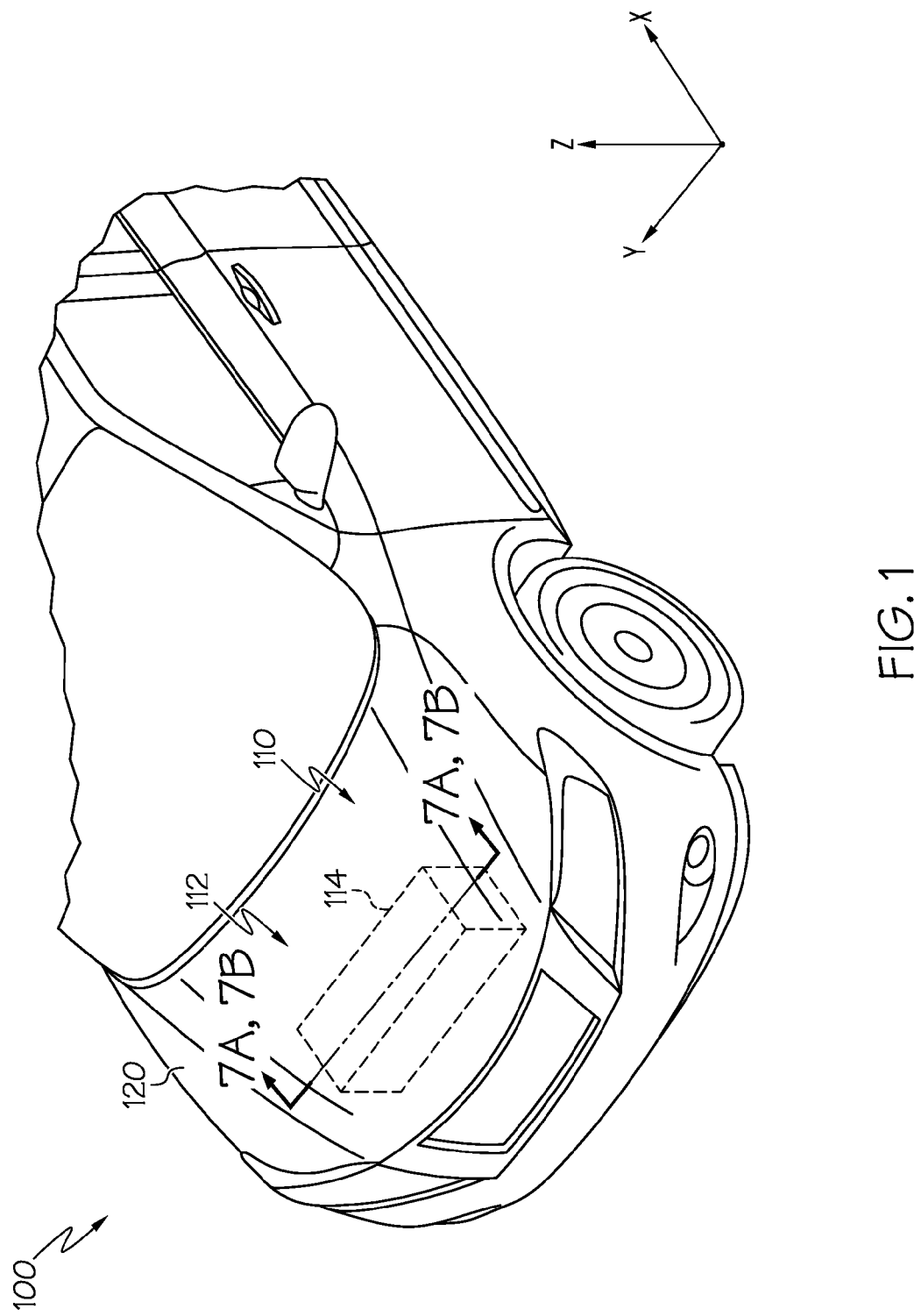
FIG. 1 schematically depicts a vehicle including vehicle hood according to one or more embodiments shown and described herein.

Referring initially to FIG. 1, a vehicle 100 includes a hood assembly 110 positioned at a forward portion of the vehicle 100. The hood assembly 110 selectively covers an engine bay 112 positioned at the forward portion of the vehicle 100. The hood assembly 110 is repositionable between a closed position, as shown in FIG. 1, and an open position that may allow access to the engine bay 112. The vehicle 100 includes a drive unit 114 positioned within the engine bay 112. The drive unit 114 may provide motive force to the vehicle 100, and may include an internal combustion engine, an electric motor, a hybrid electric drive system, or the like. While the embodiment depicted in FIG. 1 includes a drive unit 114 positioned within the engine bay 112, it should be understood that the drive unit 114 may be positioned in a rearward or middle position of the vehicle, and the engine bay 112 may be a storage compartment, such as a trunk.

Figure 2:
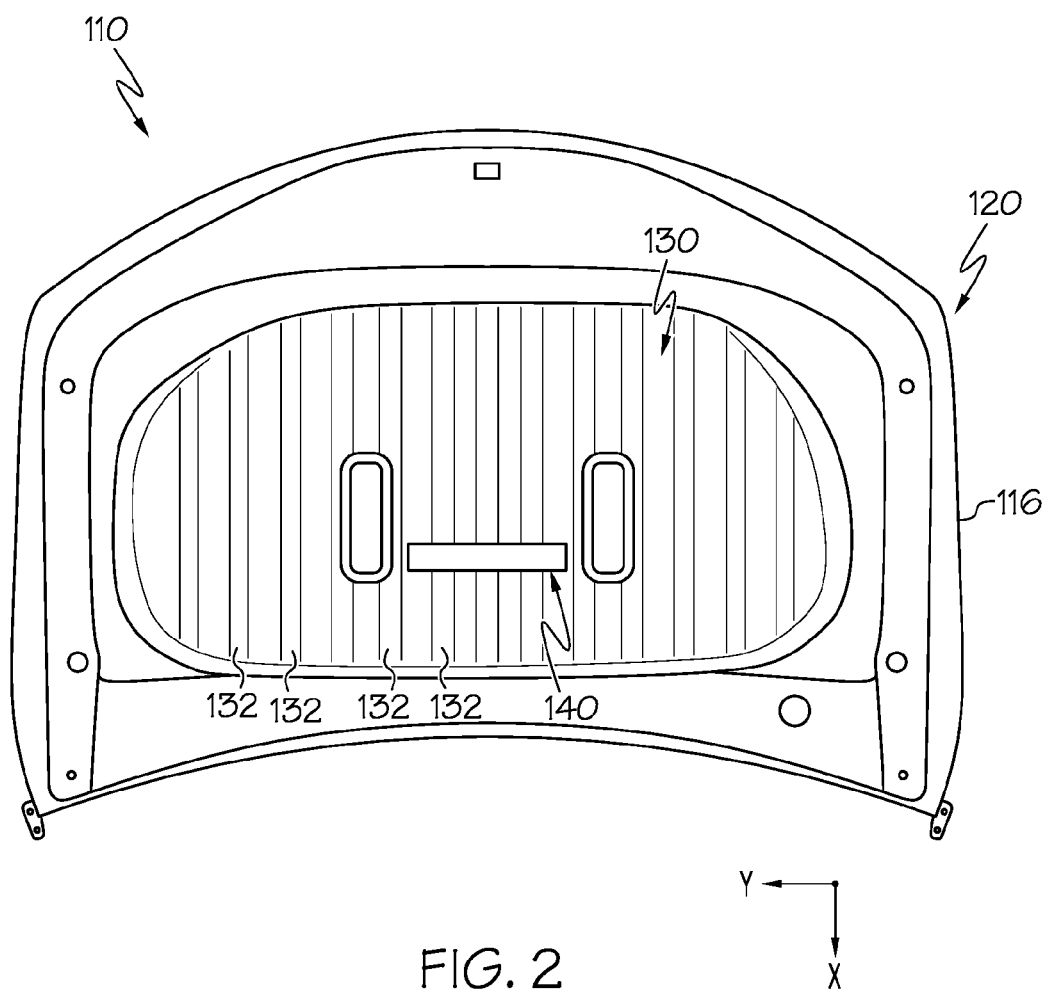
FIG. 2 schematically depicts a bottom view of the vehicle hood of FIG. 1 and a reinforcement strap according to one or more embodiments shown and described herein.

Referring to FIG. 2, a bottom view of the hood assembly 110 is depicted in isolation. The hood assembly 110 includes a hood outer panel 120 and a hood inner panel 130 coupled to the hood outer panel 120, where the hood inner panel 130 is positioned below the hood outer panel 120 in the vehicle vertical direction. The hood outer panel 120 and the hood inner panel 130 may be coextensive with one another, and the hood outer panel 120 may be coupled to the hood inner panel 130 around an outer perimeter 116 of the hood assembly 110. In the embodiment depicted in FIG. 2, the hood inner panel 130 includes a plurality of bones 132 that extend in the longitudinal direction along the hood assembly 110. The plurality of bones 132 may increase the strength of the hood assembly 110.

The hood assembly 110 includes a reinforcement strap 140 coupled to the hood inner panel 130. Alternatively, the reinforcement strap 140 may be coupled to the hood outer panel 120 or may be simultaneously coupled to both the hood inner panel 130 and the hood outer panel 120. Without wishing to be bound by theory, head impact tests to the hood areas of vehicles illustrate a need for providing relatively soft impacts (or controlled headform deceleration), particularly before the hood assembly 110 reaches relatively rigid engine components, such as the drive unit 114. The use of the reinforcement strap 140 assist in deforming the hood assembly 110 in a controlled, predictable manner that provides for controlled headform deceleration.

The reinforcement strap 140 extends across at least a portion of the hood assembly 110 in the vehicle lateral direction. In some embodiments, the reinforcement strap 140 extends across the width of the hood assembly 110, extending between the outer perimeter 116 of the hood assembly 110 in the lateral direction.

Figure 3:
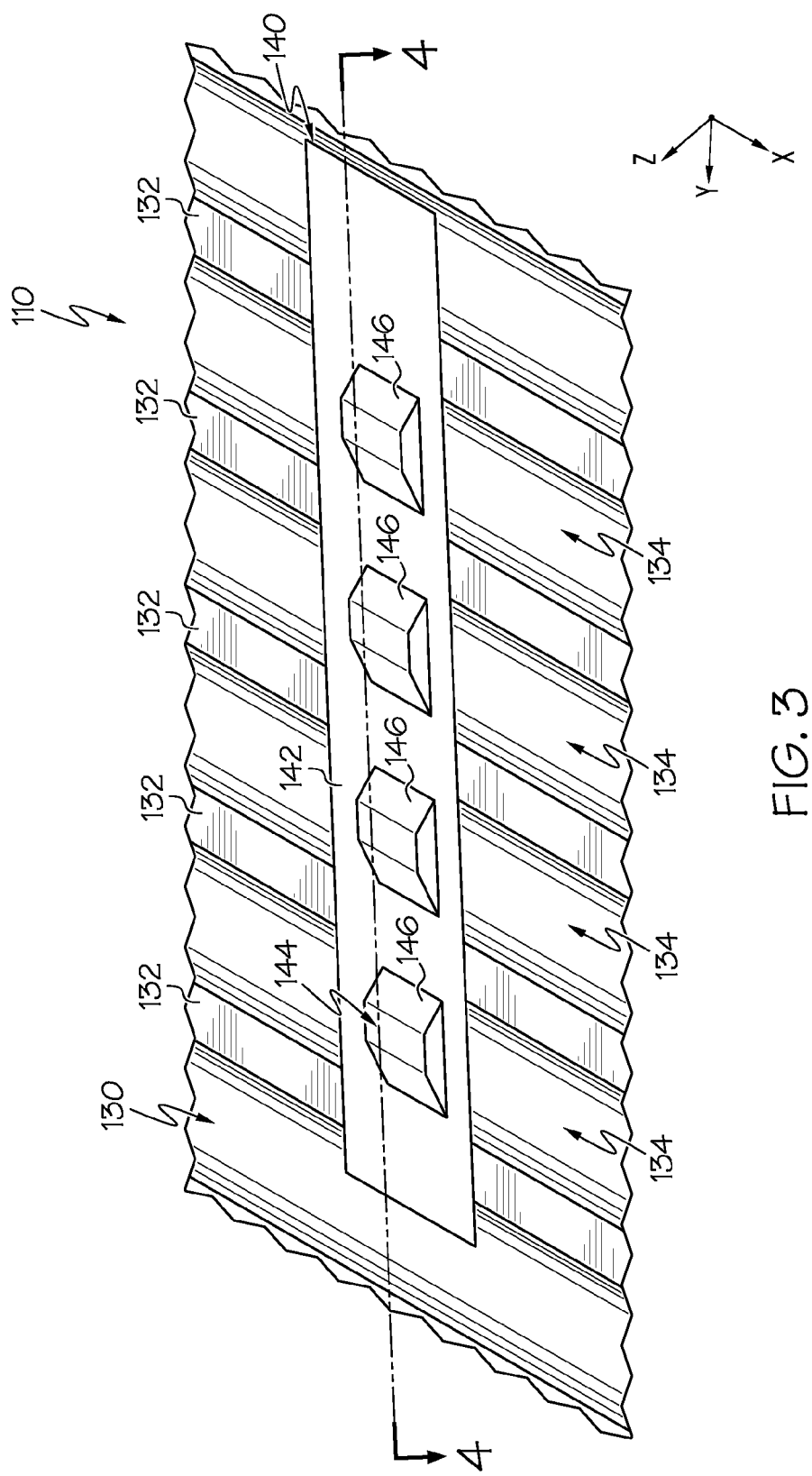
FIG. 3 schematically depicts an enlarged perspective view of the vehicle hood and the reinforcement strap of FIG. 2 according to one or more embodiments shown and described herein.

Referring to FIG. 3, an enlarged perspective view of the hood inner panel 130 and the reinforcement strap 140 is schematically depicted. The bones 132 of the hood inner panel 130 are generally aligned with one another and extend in the vehicle longitudinal direction. A plurality of recesses 134 are positioned between the plurality of bones 132 in the vehicle lateral direction, where the plurality of recesses 134 are generally aligned with one another and extend in the vehicle longitudinal direction. In particular, individual recesses of the plurality of recesses 134 are positioned between adjacent individual bones of the plurality of bones 132 in the vehicle lateral direction, such that moving across the hood assembly 110 in the vehicle lateral direction, the hood inner panel 130 alternates between a recess of the plurality of recesses 134 and a bone of the plurality of bones 132. In embodiments, the plurality of recesses 134 extend upward from the plurality of bones 132 in the vehicle vertical direction.

In the embodiment depicted in FIG. 3, the reinforcement strap 140 includes a base portion 142 and a rippled portion 144. The base portion 142 includes a generally planar shape that extends between adjacent individual bones of the plurality of bones 132 in the vehicle lateral direction. The rippled portion 144 of the reinforcement strap 140 extends outward from the base portion in the vehicle vertical direction.

Figure 4:
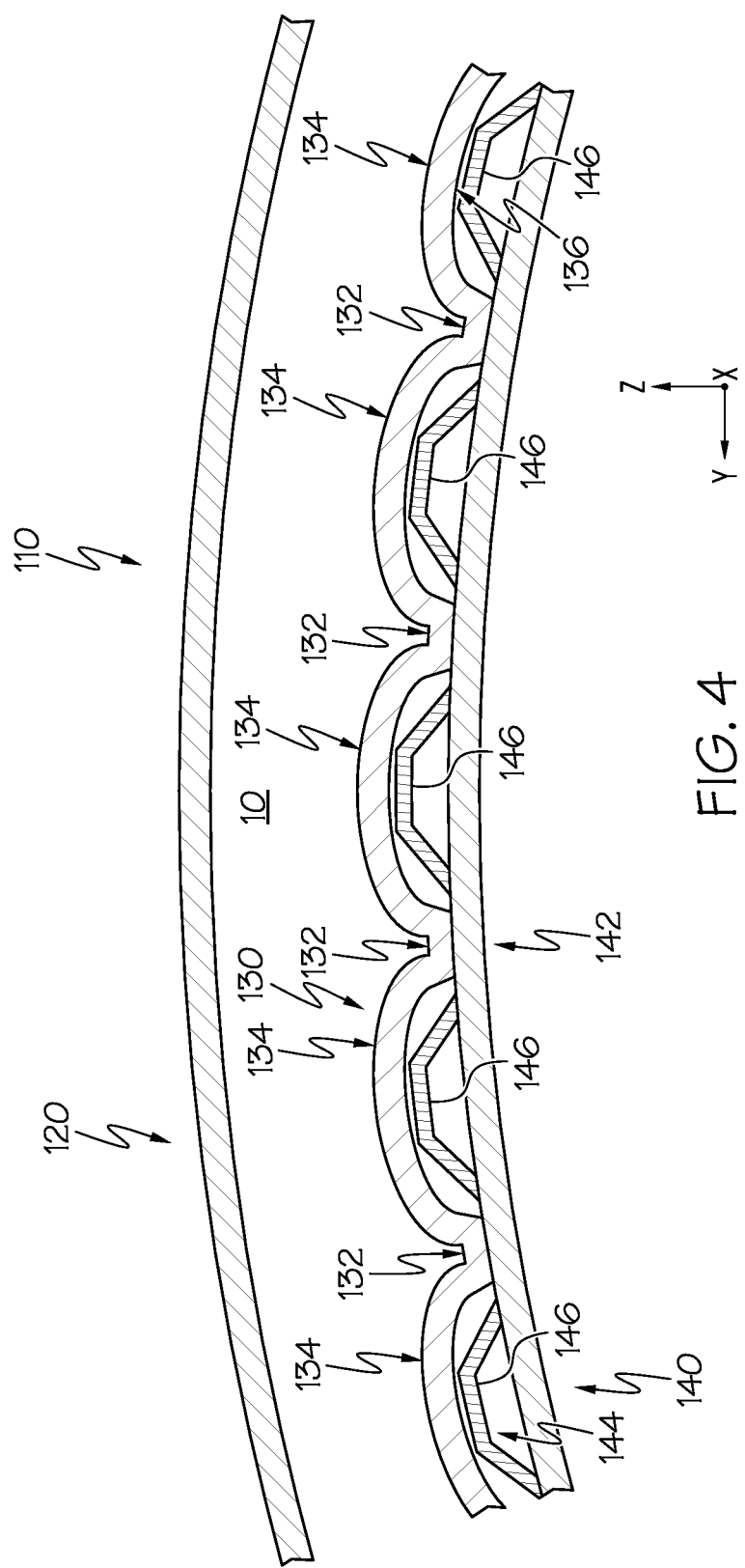
FIG. 4 schematically depicts a cross-section of the vehicle hood of FIG. 3 along section 4-4 according to one or more embodiments shown and described herein.

Referring to FIG. 4, a cross-section of the hood assembly 110 is depicted along section 4-4 of FIG. 3. In the embodiment depicted in FIG. 4, the rippled portion 144 of the reinforcement strap 140 includes a plurality of crests 146 that extend above the base portion 142 in the vehicle vertical direction, where the plurality of crests 146 extends in the vehicle lateral direction. In the embodiment depicted in FIG. 4, individual crests of the plurality of crests 146 are positioned at least partially within individual recesses of the plurality of recesses 134.

The reinforcement strap 140 is coupled to the hood inner panel 130, and in particular, the base portion 142 is coupled to the plurality of bones 132 of the hood inner panel 130. Alternatively or additionally, the individual crests of the plurality of crests 146 may be coupled to individual recesses of the plurality of recesses 134.

Figure 5A:
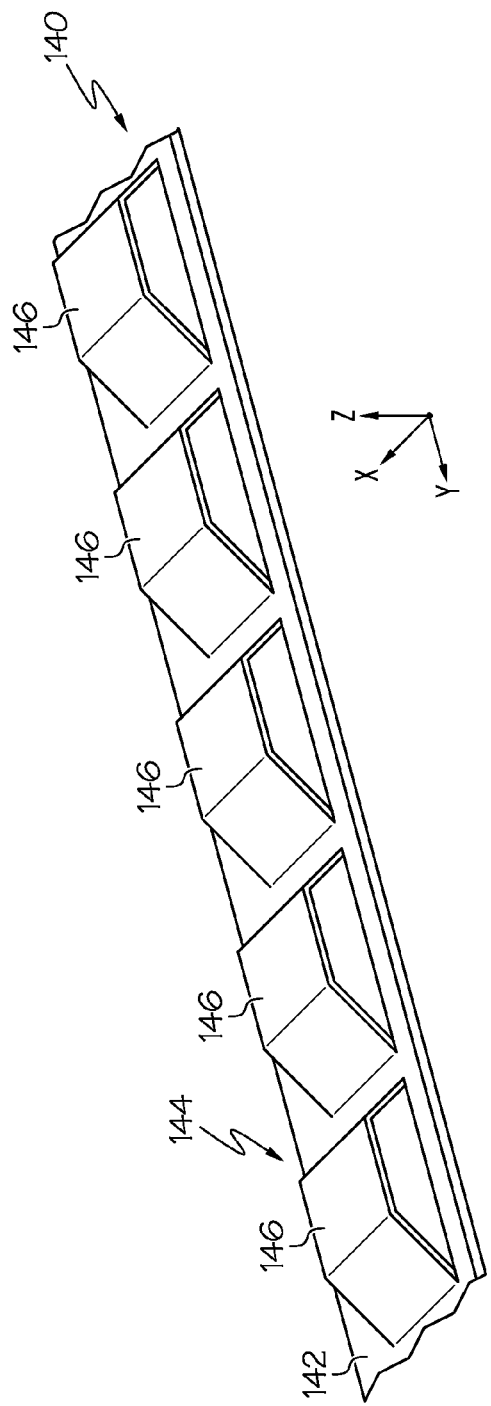
FIG. 5A schematically depicts a perspective view of the reinforcement strap of FIG. 3 depicted in isolation according to one or more embodiments shown and described herein.
Figure 5B:
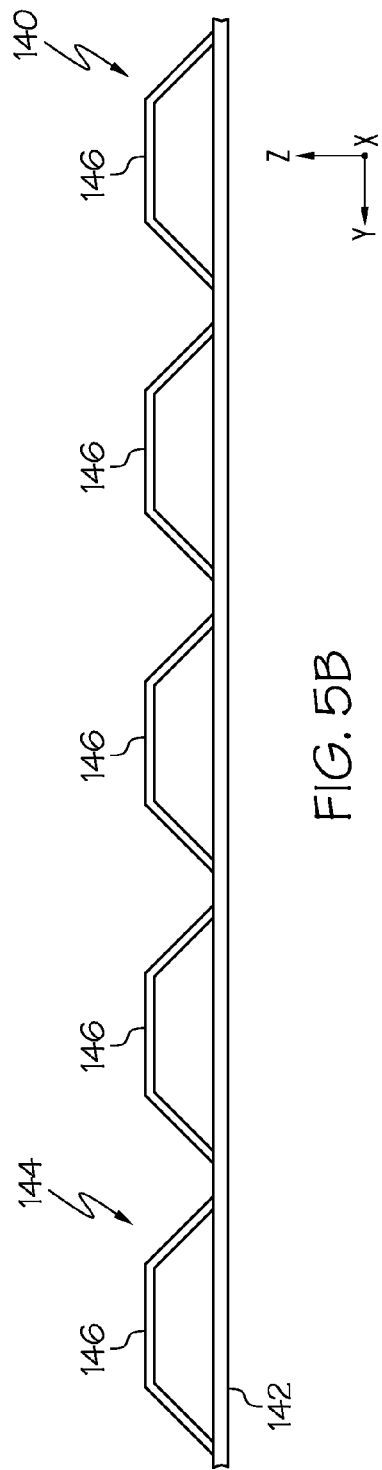
FIG. 5B schematically depicts a side view of the reinforcement strap of FIG. 6A according to one or more embodiments shown and described herein.

Referring to FIGS. 5A and 5B collectively, a perspective view and a front view of the reinforcement strap 140 are depicted, respectively. In embodiments, the base portion 142 and the plurality of crests 146 may be integral with one another. Alternatively, the plurality of crests 146 may be coupled to the base portion 142. Individual crests of the plurality of crests 146 may include a generally trapezoidal shape that extends above the base portion 142 in the vehicle vertical direction. Alternatively, the plurality of crests 146 may include a curved shape, a square shape, or any other suitable shape that extends above the base portion 142 in the vehicle vertical direction. The base portion 142 and the plurality of crests 146 may be formed of any suitable material or combination of material, including, but not limited to, metals, plastics, foams, or the like.

Referring to FIGS. 6A and 6B collectively, a perspective view and a front view of another reinforcement strap 140 are depicted, respectively. In the embodiment depicted in FIGS. 6A and 6B, the rippled portion 144 includes a plurality of troughs 148 that extend below the base portion 142 in the vehicle vertical direction, where the plurality of troughs 148 extends in the vehicle lateral direction. The rippled portion 144 of the reinforcement strap 140 additionally includes the plurality of crests 146 that extend above the base portion 142 in the vehicle vertical direction. Alternatively, the rippled portion 144 of the reinforcement strap 140 may only include the plurality of troughs 148 that extend below the base portion 142 in the vehicle vertical direction. In embodiments that include both the plurality of crests 146 and the plurality of troughs 148, the rippled portion 144 of the reinforcement strap 140 alternates between the individual crests of the plurality of crests 146 and individual troughs of the plurality of troughs 148 moving across the reinforcement strap 140 in the vehicle lateral direction.

Individual troughs of the plurality of troughs 148 may include a generally trapezoidal shape that extends below the base portion 142 in the vehicle vertical direction. Alternatively, the plurality of troughs 148 may include a curved shape, a square shape, or any other suitable shape that extends below the base portion 142 in the vehicle vertical direction. The base portion 142 and the plurality of troughs 148 may be formed of any suitable material or combination of material, including, but not limited to, metals, plastics, foams, or the like.

Referring to FIG. 7A, a cross-section of the hood assembly 110 and the drive unit 114 along section 7A-7A of FIG. 1 is schematically depicted. During ordinary vehicle operation, the hood assembly 110 is spaced apart from the drive unit 114 in the vehicle vertical direction. Further, the hood outer panel 120 is spaced apart from the hood inner panel 130 in the vehicle vertical direction, such that the hood outer panel 120 and the hood inner panel 130 define a gap 10 positioned between the hood outer panel 120 and the hood inner panel 130 in the vehicle vertical direction. The reinforcement strap 140 is positioned above and is spaced apart from the drive unit 114 in the vehicle vertical direction, and the base portion 142 of the reinforcement strap is spaced apart from the drive unit 114 by a height 14 evaluated in the vehicle vertical direction. In embodiments that include the plurality of troughs 148, the plurality of troughs 148 are spaced apart from the drive unit 114 by a height 12 evaluated in the vehicle vertical direction, where the height 12 is less than the height 14. Accordingly, the plurality of troughs 148 are positioned closer to the drive unit 114 in the vehicle vertical direction than the base portion 142 of the reinforcement strap 140.

During an impact, such as an impact with a headform, the hood assembly 110 may selectively deform and move downward in the vehicle vertical direction to absorb energy associated with the impact. By absorbing energy associated with the impact, the hood assembly 110 may assist in decelerating the headform in a controlled manner.

As the hood assembly 110 deforms and translates downward in the vehicle vertical direction, the reinforcement strap 140 is repositioned from a disengaged position, in which the reinforcement strap 140 is spaced apart from the drive unit 114, to an engaged position, in which the reinforcement strap 140 engages the drive unit 114.

Referring to FIG. 7B, a cross-section of the hood assembly 110 and the drive unit 114 along section 7B-7B of FIG. 1 is schematically depicted during an impact. A barrier 20, such as a headform, may impact the hood assembly 110, causing the hood assembly 110 to deform and translate downward in the vehicle vertical direction. The barrier 20 may impact the hood outer panel 120, causing the hood outer panel 120 to deform and move downward in the vehicle vertical direction, such that the hood outer panel 120 traverses the gap 10 (FIG. 7A) between the hood outer panel 120 and the hood inner panel 130. In some impact configurations, the hood outer panel 120 may engage the hood inner panel 130.

As the hood outer panel 120 contacts the hood inner panel 130, the hood inner panel 130 may deform and translate downward in the vehicle vertical direction. In the embodiment depicted in FIG. 7B, the reinforcement strap 140 is coupled to the hood inner panel 130. By coupling the reinforcement strap 140 to the hood inner panel 130, as the hood inner panel 130 deforms and translates downward, the reinforcement strap 140 may deform and translate downward with the hood inner panel 130, and the reinforcement strap 140 may deform and absorb energy associated with the impact, thereby assisting in decelerating the barrier 20.

When the reinforcement strap 140 includes the plurality of crests 146, such as in the embodiment depicted in FIG. 7B, the plurality of crests 146 may deform and translate downward in the vehicle vertical direction with respect to the base portion 142 of the reinforcement strap 140. In particular, the hood inner panel 130 may engage the plurality of crests 146, causing the plurality of crests 146 to deform and translate downward in the vehicle vertical direction toward the base portion 142 of the reinforcement strap 140. As the plurality of crests 146 deform, the plurality of crests 146 may absorb energy associated with the impact, thereby assisting in decelerating the barrier 20.

When the reinforcement strap 140 includes the plurality of troughs 148, such as in the embodiment depicted in FIG. 7B, the plurality of troughs 148 may contact and engage the drive unit 114 in the vehicle vertical direction prior to the hood inner panel 130 contacting the drive unit 114. As described above with respect to FIG. 7A, the plurality of troughs 148 are positioned closer to the drive unit 114 in the vehicle vertical direction than the base portion 142 of the reinforcement strap 140. Because the plurality of troughs 148 are positioned closer to the drive unit 114, the plurality of troughs 148 may engage the drive unit 114 at an earlier time during the impact as compared to reinforcement straps 140 that do not include a plurality of troughs 148. By causing the reinforcement strap 140 to engage the drive unit 114 at an earlier time during the impact, the plurality of troughs 148 may assist in controllably deforming the hood assembly 110.

Referring again to FIG. 7A, the plurality of troughs 148 are spaced apart from the drive unit 114 in the vehicle vertical direction by the height 12. During an impact, the hood assembly 110 translates downward in the vehicle vertical direction, moving the reinforcement strap 140 downward across the height 12 between the plurality of troughs 148 and the drive unit 114. As the reinforcement strap 140 moves across the height 12, resistance to the downward movement of the hood assembly 110 may be limited. However, when the reinforcement strap 140 engages the drive unit 114, the downward movement of the reinforcement strap 140, and accordingly, the hood assembly 110, may be resisted by the drive unit 114. Resistance against the downward movement of the reinforcement strap 140 may cause the reinforcement strap 140 and the hood assembly 110 to deform, thereby absorbing energy associated with the impact. Accordingly, by engaging the drive unit 114 at an earlier time during the impact as compared to hood assemblies that do not include a plurality of troughs 148, the reinforcement strap 140 may assist in absorbing energy associated with the impact.

Figure 8:
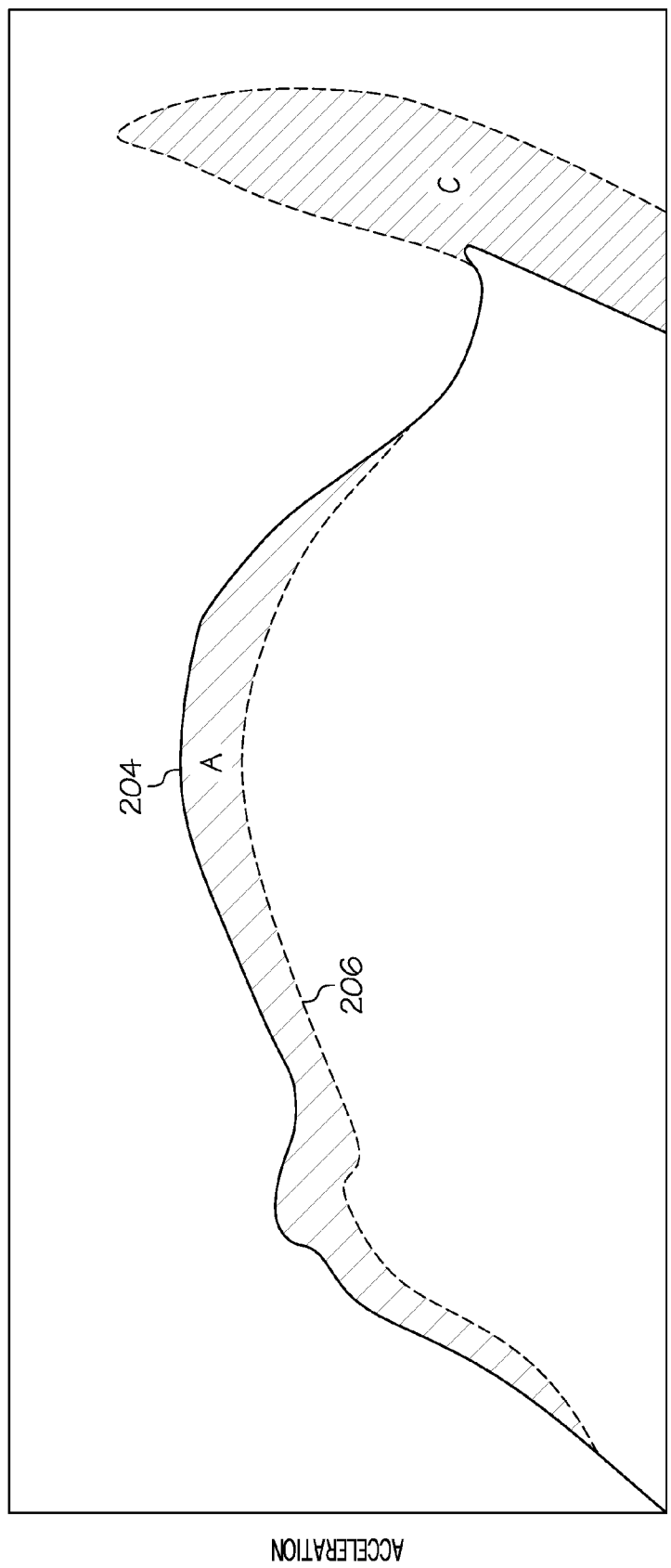
FIG. 8 schematically depicts an exemplary graph of acceleration versus stroke for a hood assembly including the reinforcement strap of FIG. 5A compared to a hood assembly without the reinforcement strap according to one or more embodiments shown and described herein.

Referring to FIG. 8, a graph of acceleration versus stroke is shown for a hood assembly 110 including the reinforcement strap 140 (solid line 204) compared to a vehicle hood assembly without the reinforcement strap (dashed line 206). The graph of FIG. 8 may be generated using data collected from any suitable testing procedure, such as Japan New Car Assessment Program (JNCAP), Euro NCAP or Global Technical Regulation (GTR) No. 9 testing procedures for pedestrians. As can be seen by line 204, an additional amount of energy absorption is provided at area A prior to hood inner panel 130 contact with the drive unit 114. Increasing the amount of energy absorbed prior to contact with the drive unit 114 or other engine components using the reinforcement strap 140 can reduce the hood assembly 110 and engine cover from being a primary source of impact energy absorption. As can be seen by area C, stiff structures, such as engine components can provide relatively sharp spikes in headform acceleration.

Figure 9:
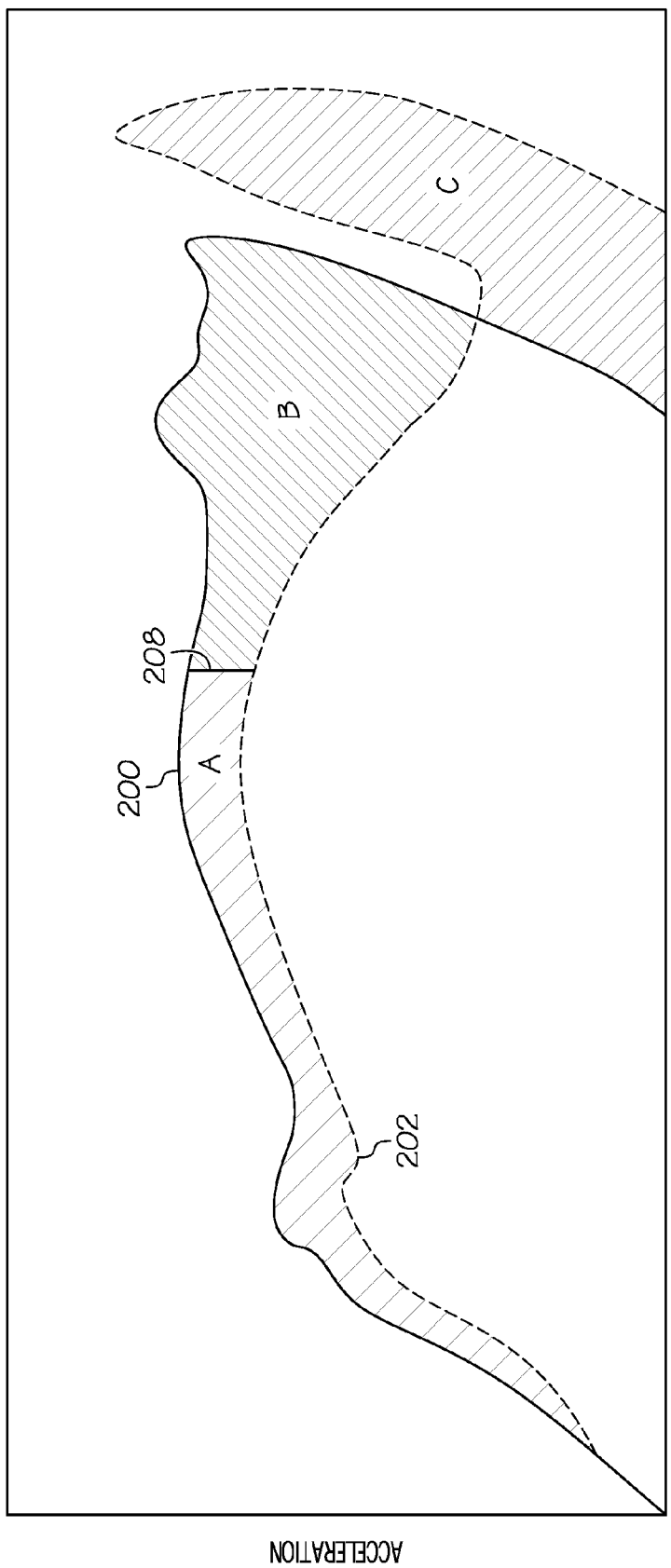
FIG. 9 schematically depicts an exemplary graph of acceleration versus stroke for a hood assembly including the reinforcement strap of FIG. 6A compared to a hood assembly without the reinforcement strap according to one or more embodiments shown and described herein.

Referring to FIG. 9, a graph of acceleration versus stroke is shown for a hood assembly 110 including the reinforcement strap 140 including the plurality of troughs 148 (solid line 200) compared to a vehicle hood assembly without the reinforcement strap (dashed line 202). The graph of FIG. 9 may be generated using data collected from any suitable testing procedure, such as Japan New Car Assessment Program (JNCAP), Euro NCAP or Global Technical Regulation (GTR) No. 9 testing procedures for pedestrians. As can be seen by line 200, an additional amount of energy absorption is provided at area A prior to hood inner panel contact with the drive unit 114. Increasing the amount of energy absorbed prior to contact with the drive unit 114 or other engine components using the reinforcement strap 140 can reduce the hood assembly 110 and engine cover from being a primary source of impact energy absorption. At position 208, the plurality of troughs 148 may contact engine components, such as the drive unit 114, and the reinforcement strap 140 may continue to absorb additional energy as the plurality of troughs 148 deform, as can be seen by area B. As can be seen by area C, stiff structures, such as engine components can provide relatively sharp spikes in headform acceleration.

The reinforcement strap may be coupled to the inner hood panel by any suitable method, including, but not limited to, welding, brazing, connection with mechanical fasteners (e.g., clips, bolts etc.), and/or connection with structural adhesives. In some embodiments, plurality of crests and the plurality of troughs of the reinforcement straps may be filled with a deformable material, such as foam to further tune buckling of the hood assembly.

The above-described reinforcement straps provide a reinforcement structure that can be attached to the hood inner panel to provide increased energy absorption following vehicle hood assembly bucking toward engine components. The reinforcement straps not only provide for increased energy absorption, but also increased energy absorption with decreased stroke without seeing a spike in acceleration of a headform upon hood inner panel contact with the drive unit.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle hood assembly comprising:
   an outer hood panel;
   a hood inner panel coupled to and positioned below the outer hood panel in a vehicle vertical direction, wherein the hood inner panel comprises:
      a plurality of bones that extend in a vehicle longitudinal direction; and
      a plurality of recesses that extend in the vehicle longitudinal direction, where individual recesses are positioned between adjacent individual bones in a vehicle lateral direction; and
   a hood reinforcement strap coupled to at least one of the outer hood panel and the hood inner panel, the hood reinforcement strap comprising a strap base and lobe structures spaced-apart along a length of the strap base that extend outward from the strap base in the vehicle vertical direction.

2. The vehicle hood assembly of claim 1, wherein the rippled portion of the reinforcement strap comprises a trough that extends below the base portion in the vehicle vertical direction.

3. The vehicle hood assembly of claim 1, wherein the rippled portion of the reinforcement strap comprises a crest that extends above the base portion in the vehicle vertical direction.

4. The vehicle hood assembly of claim 3, wherein the hood inner panel comprises:
   a plurality of bones that extend in a vehicle longitudinal direction; and
   a plurality of recesses that extend in the vehicle longitudinal direction, wherein individual recesses are positioned between adjacent individual bones in a vehicle lateral direction that is transverse to the vehicle longitudinal direction.

5. The vehicle hood assembly of claim 4, wherein the crest of the reinforcement strap is positioned within one of the plurality of recesses.

6. The vehicle hood assembly of claim 1, wherein the rippled portion of the reinforcement strap comprises a plurality of crests that extend in a vehicle lateral direction, wherein each of the plurality of crests extend above the base portion in the vehicle vertical direction.

7. The vehicle hood assembly of claim 1, wherein the rippled portion of the reinforcement strap comprises a plurality of troughs that extend in a vehicle lateral direction, wherein each of the plurality of troughs extend below the base portion in the vehicle vertical direction.

8. The vehicle hood assembly of claim 1, wherein the reinforcement strap is coupled to the hood inner panel.

9. The vehicle hood assembly of claim 1, wherein the reinforcement strap is positioned beneath the hood inner panel in the vehicle vertical direction.

10. The vehicle hood assembly of claim 1, where the reinforcement strap is positioned between the hood outer panel and the hood inner panel in the vehicle vertical direction.

11. A vehicle comprising:
    an engine bay;
    a drive unit positioned in the engine bay;
    a hood assembly selectively positioned over the engine bay, the hood assembly comprising a hood outer panel and a hood inner panel positioned below the hood outer panel in a vehicle vertical direction, wherein the hood inner panel comprises:

a plurality of bones that extend in a vehicle longitudinal direction; and a plurality of recesses that extend in the vehicle longitudinal direction, where individual recesses are positioned between adjacent individual bones in a vehicle lateral direction; and a reinforcement strap coupled to at least one of the hood inner panel and the hood outer panel, the reinforcement strap comprising a base portion and a trough extending downward from the base portion in the vehicle vertical direction.

12. The vehicle of claim 11, wherein the reinforcement strap further comprises a crest that extends above the base portion in the vehicle vertical direction.

13. The vehicle of claim 11, wherein the reinforcement strap is positioned above the drive unit in the vehicle vertical direction.

14. The vehicle of claim 11, wherein the reinforcement strap is coupled to the hood inner panel.

15. The vehicle of claim 11, wherein the reinforcement strap is repositionable from a disengaged position, in which the reinforcement strap is spaced apart from the drive unit in the vehicle vertical direction, and an engaged position, in which the reinforcement strap engages the drive unit.

16. A vehicle comprising:
an engine bay;
a drive unit positioned in the engine bay;
a hood selectively positioned over the engine bay, the hood comprising a hood outer panel and a hood inner panel positioned below the hood outer panel in a vehicle vertical direction, wherein the hood inner panel comprises a plurality of bones extending in a vehicle longitudinal direction; and
a reinforcement strap extending across and coupled to the plurality of bones, the reinforcement strap comprising a base portion and a rippled portion that extends outward from the base portion in the vehicle vertical direction, wherein the base portion extends between adjacent bones in a vehicle lateral direction.

17. The vehicle of claim 16, wherein the reinforcement strap is positioned above the drive unit in the vehicle vertical direction.

18. The vehicle of claim 16, wherein the rippled portion of the reinforcement strap comprises a crest that extends above the base portion in the vehicle vertical direction.

19. The vehicle of claim 18, wherein at least one of the base portion and the crest is coupled to the hood inner panel.

20. The vehicle of claim 16, wherein the rippled portion of the reinforcement strap comprises a trough that extends below the base portion in the vehicle vertical direction.

* * * * *